US007242105B2

(12) United States Patent
Mehl et al.

(10) Patent No.: US 7,242,105 B2

(45) Date of Patent: Jul. 10, 2007

(54) ELECTRIC ENGINE START WITH TWO MOTORS AND SINGLE MOTOR DRIVE

(75) Inventors: Byron R. Mehl, Belvidere, IL (US); Donal Baker, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 11/205,699

(22) Filed: Aug. 17, 2005

(65) Prior Publication Data

US 2007/0040383 A1 Feb. 22, 2007

(51) Int. Cl.
*H02P 9/10* (2006.01)

(52) U.S. Cl. ...................................... 290/36 R; 322/59

(58) Field of Classification Search ............... 290/36 R
See application file for complete search history.

(56) References Cited

U.S. PATENT DOCUMENTS

| | | | | |
|---|---|---|---|---|
| 4,208,620 | A * | 6/1980 | Ringland | 318/111 |
| 4,456,830 | A * | 6/1984 | Cronin | 290/27 |
| 4,724,331 | A * | 2/1988 | Nordlund | 290/38 R |
| 6,351,090 | B1 * | 2/2002 | Boyer et al. | 318/139 |
| 6,812,657 | B2 * | 11/2004 | Raimondi | 318/107 |
| 6,838,779 | B1 * | 1/2005 | Kandil et al. | 290/31 |
| 7,002,317 | B2 * | 2/2006 | Ganev | 318/701 |
| 7,064,455 | B2 * | 6/2006 | Lando | 290/1 C |
| 7,116,003 | B2 * | 10/2006 | Hoppe | 290/1 A |
| 2005/0046398 | A1 * | 3/2005 | Anghel et al. | 322/60 |
| 2006/0061336 | A1 * | 3/2006 | Anghel et al. | 322/59 |
| 2006/0087123 | A1 * | 4/2006 | Stout et al. | 290/2 |
| 2006/0168968 | A1 * | 8/2006 | Zielinski et al. | 60/778 |

FOREIGN PATENT DOCUMENTS

| | | | |
|---|---|---|---|
| JP | 2005098296 A * | 4/2005 | |
| WO | WO 9915402 A2 * | 4/1999 | |

* cited by examiner

*Primary Examiner*—Joseph Waks
(74) *Attorney, Agent, or Firm*—Carlson, Gaskey & Olds, P.C.

(57) ABSTRACT

An electrical starter-generator system includes a first starter-generator and a second starter-generator. A single drive controls both the first starter-generator and the second starter-generator such that their electrical current and power inputs are minimized and balanced.

11 Claims, 6 Drawing Sheets

ELECTRIC ENGINE START WITH TWO MOTORS AND SINGLE MOTOR DRIVE

BACKGROUND OF THE INVENTION

This invention relates to electric motor starter-generators and, more particularly, to an electric starter-generator system for an aircraft engine having a motor drive that controls two starter-generators coupled to the aircraft engine.

Vehicles, such as aircraft, utilize an electric starter-generator system to start a gas turbine engine. The electric starter-generator system provides torque to the engine to rotate the engine from a zero speed to a speed that is appropriate for starting the engine. Conventional starter-generator systems may include two or more starter-generators that are coupled to the engine to provide a relatively large amount of torque necessary to spool-up the engine. In a starter mode, the starter-generators rotate the jet engine. In a generate mode, the starter-generators convert mechanical energy from rotation of the jet engine into electrical energy for the aircraft.

Typically, each of the starter-generator systems includes a motor drive, such as a motor drive inverter, that powers and individually controls the respective starter-generator in the starter mode. Each motor drive controls the speed and torque output of the respective starter-generator independently from the other motor drive during operation. Disadvantageously, utilizing a motor drive for each starter-generator adds size, expense, and weight to the electric engine starter assembly.

Accordingly, there is a need for an electric starter-generator system having a single motor drive that controls multiple starter-generators to reduce the size, weight, and expense of the electric starter-generator system.

SUMMARY OF THE INVENTION

The electric starter-generator system according to the present invention includes a first starter-generator and a second starter-generator operating as motors such that their internal electro-motive forces are approximately in phase with each other. A drive in electrical communication with the first starter-generator and the second starter-generator provides ac electrical power to the first starter-generator and the second starter-generator such that this applied power is synchronized with first electro-motive force of the first starter-generator and with the second electro-motive force of the second starter-generator. The motor drive establishes the voltages at the terminals of the starter-generators and they draw current and produce mechanical power as a function of the magnitude and phase of their internal electro-motive forces relative to this applied voltage.

A method of controlling an electric starter-generator system according to the present invention includes mounting the starter-generator such that a first rotor of the first starter-generator is mechanically aligned with a second rotor of the second starter-generator. The mechanical alignment assures that the first electro-motive force of the first starter-generator is in phase relative to a second electro-motive force of the second starter-generator.

In another embodiment, the method of controlling an electric starter-generator system includes determining a first quadrature electrical signal representing quadrature axis (torque-producing) current for the first starter-generator and determining a second quadrature electrical signal representing quadrature axis current for the second starter-generator.

A first electrical voltage control input into the first starter-generator is controlled relative to a second electrical voltage control input into the second starter-generator based upon the first quadrature electrical signal and the second quadrature electrical signal. The voltage control inputs determine the magnitudes of the starter-generator's internal electro-motive forces.

Accordingly, the disclosed electric starter-generator system provides a single motor drive that controls multiple starter-generators to reduce the size, weight, and expense of the electric starter-generator system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
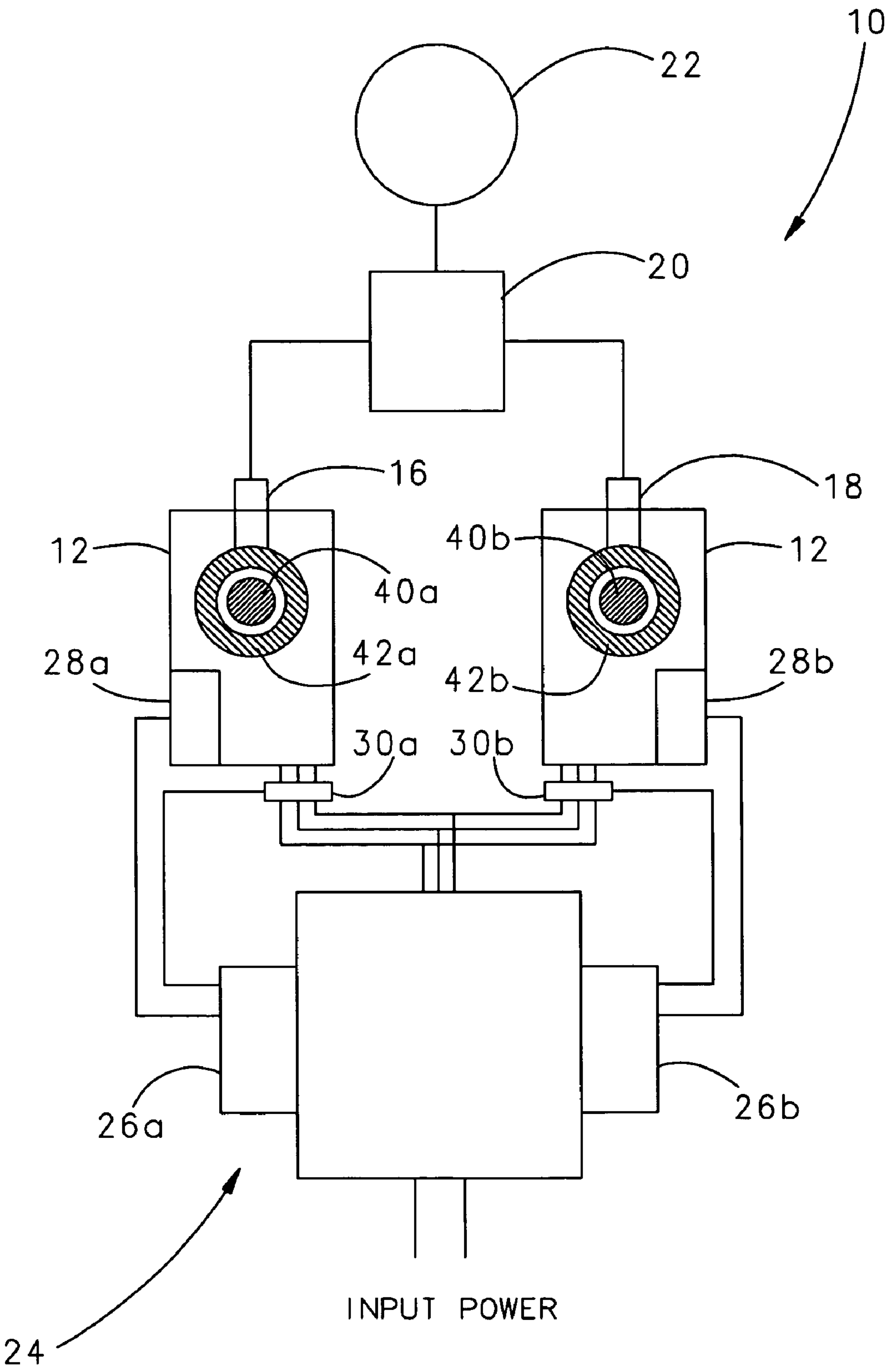
FIG. 1 is a schematic view of an electric starter-generator system.

FIG. 1 illustrates selected portions of an electric starter-generator system 10 including a first starter-generator 12 and a second starter-generator 14, such as wound field synchronous starter-generators. The first starter-generator 12 and the second starter-generator 14 respectively include a first output shaft 16 and a second output shaft 18 that are coupled to a gear box 20. The gear box 20 is coupled to an engine 22, such as a gas turbine engine. The first starter-generator 12 and the second starter-generator 14 provide torque to the engine 22 through the gear box 20 to spool-up the engine 22 to a dwelling point to initiate light off. Once the engine 22 is started, the engine 22 transfers mechanical energy through the gear box 20 to the first starter-generator 12 and the second starter-generator 14, such that the starter-generator 12 and 14 operate as generators.

The electric starter-generator system 10 includes a drive 24, such as a motor drive inverter, which powers and controls both the first starter-generator 12 and the second starter-generator 14. The drive 24 receives electrical input power and delivers the electrical power to the first starter-generator 12 and the second starter-generator 14 to produce the output torque.

The drive 24 includes a first exciter control 26*a* and a second exciter control 26*b*. The first exciter control 26*a* is in electrical communication with a first exciter 28*a* located within the first starter-generator 12 and the second exciter control 26*b* is in electrical communication with a second exciter 28*b* within the second starter-generator 14. The first exciter 28*a* and the second exciter 28*b* receive an electrical input from, respectively, the first exciter control 26*a* and the second exciter control 26*b*. Each of the first exciter 28*a* and the second exciter 28*b* are preferably inverters, which produce a field electric current for input into the respective first starter-generator 12 or second starter-generator 14, as will be described below.

The first exciter control 26*a* is in electrical communication with a first sensor 30*a* and the second exciter control 26*b* in electrical communication with a second sensor 30*b*. The first sensor 30*a* and the second sensor 30*b* detect the magnitudes and phase relationships of the electrical current inputs into the respective first starter-generator 12 and second starter-generator 14 and provide signals to drive 24 that corresponds to the magnitude and phase of the electrical current inputs.

The output shaft 16 of the first starter-generator 12 is coupled to a first rotor 40*a* for rotation therewith. The first rotor 40*a* is located coaxially with a first stator 42*a*, which cooperate to provide torque to the output shaft 16 or generate an electrical output from mechanical energy provided by the engine 22. Likewise, the second starter-generator 14 includes a second rotor 40*b* coupled to the second output shaft 18 and is coaxial with a second stator 42*b*.

Preferably, the first rotor 40*a* is mechanically aligned with the second rotor 40*b* and the first stator 42*a* is mechanically aligned with the second stator 42*b*. This provides the benefit of producing electro-motive forces in the first starter-generator 12 and the second starter-generator 14 that are approximately in phase with each other. Preferably, the electro-motive forces are within a few degrees of each other. If the electro-motive forces of the first starter-generator 12 and the second starter-generator 14 are not in phase, a waste electric current will flow between the first starter-generator 12 and the second starter-generator 14, which may result in inefficient operation.

Figure 2:
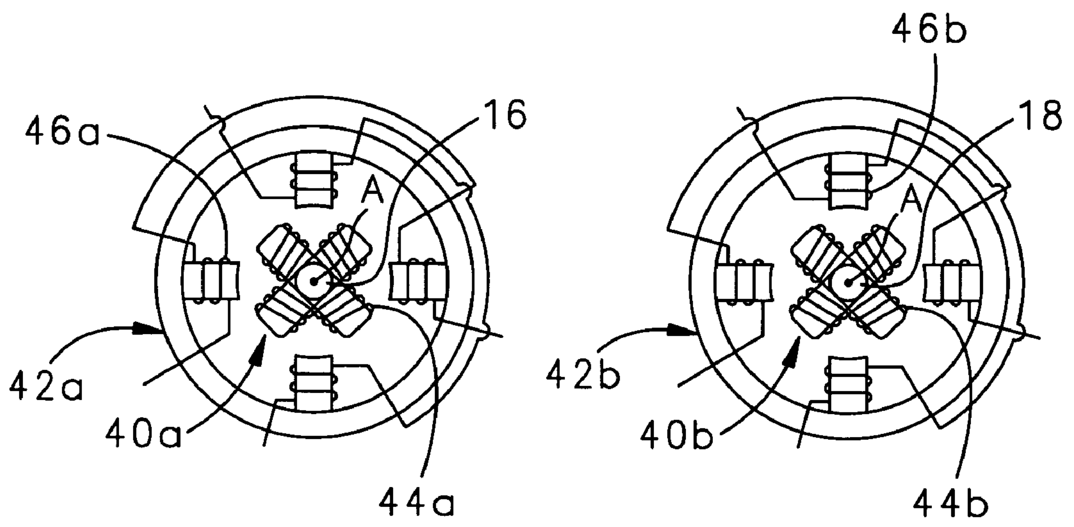
FIG. 2 is a schematic view of mechanically aligned starter-generators.

Referring to FIG. 2, the first rotor 40*a*, second rotor 40*b*, first stator 42*a* and second stator 42*b* are shown schematically to illustrate one example of mechanical alignment. In the illustration, the first rotor 40*a* includes first rotor windings 44*a* having a first orientation and the second rotor 40*b* includes second rotor windings 44*b* having a second orientation. The orientation refers to the relative position of the winding in space, such as the position relative to an axis of rotation A, shaft, stator, or other selected member. The first rotor windings 44*a* are approximately mechanically aligned with the second rotor windings 44*b*. That is, the first orientation is about equal to the second orientation. This also means that the fluxes produced by the respective first rotor windings 44*a* and the second rotor windings 44*b* are nearly in alignment with each other.

Similarly, the first stator 42*a* includes first stator windings 46*a* having a first stator winding orientation and the second stator 42*b* includes second stator windings 46*b* having a second stator winding orientation. The first stator windings 46*a* are in mechanical alignment with the second stator windings 46*b* such that the first stator winding orientation is about equal to the second stator winding orientation. This also means that the fluxes produced by the first stator windings 46*a* are nearly in alignment with the fluxes produced by the second stator windings 46*b*.

The starter-generators 12 and 14 are aligned when the angle between the rotor 40*a* of the first starter-generator 12 and a reference point on stator 42*a* is identical to the angle between the second rotor 40*b* of the second starter-generator 14 and the same reference point on the second stator 42*b*. The machines would still be in alignment if the stator of one machine was rotated in space relative to the stator of the other machine(s) if its rotor was also rotated by the same amount.

The alignment of the first rotor windings 44*a* with the second rotor windings 44*b* and the first stator windings 46*a* with the second stator windings 46*b* provides the benefit of producing electro-motive forces in the first starter-generator 12 and the second starter-generator 14 that are approximately in phase with each other. This reduces any waste electrical current that flows between the first starter-generator 12 and the second starter-generator 14. Thus, the first rotor 40*a* maintains a mechanical alignment with the second rotor 40*b* as they respectively rotate about the first output shaft 16 and the second output shaft 18.

Figure 3:
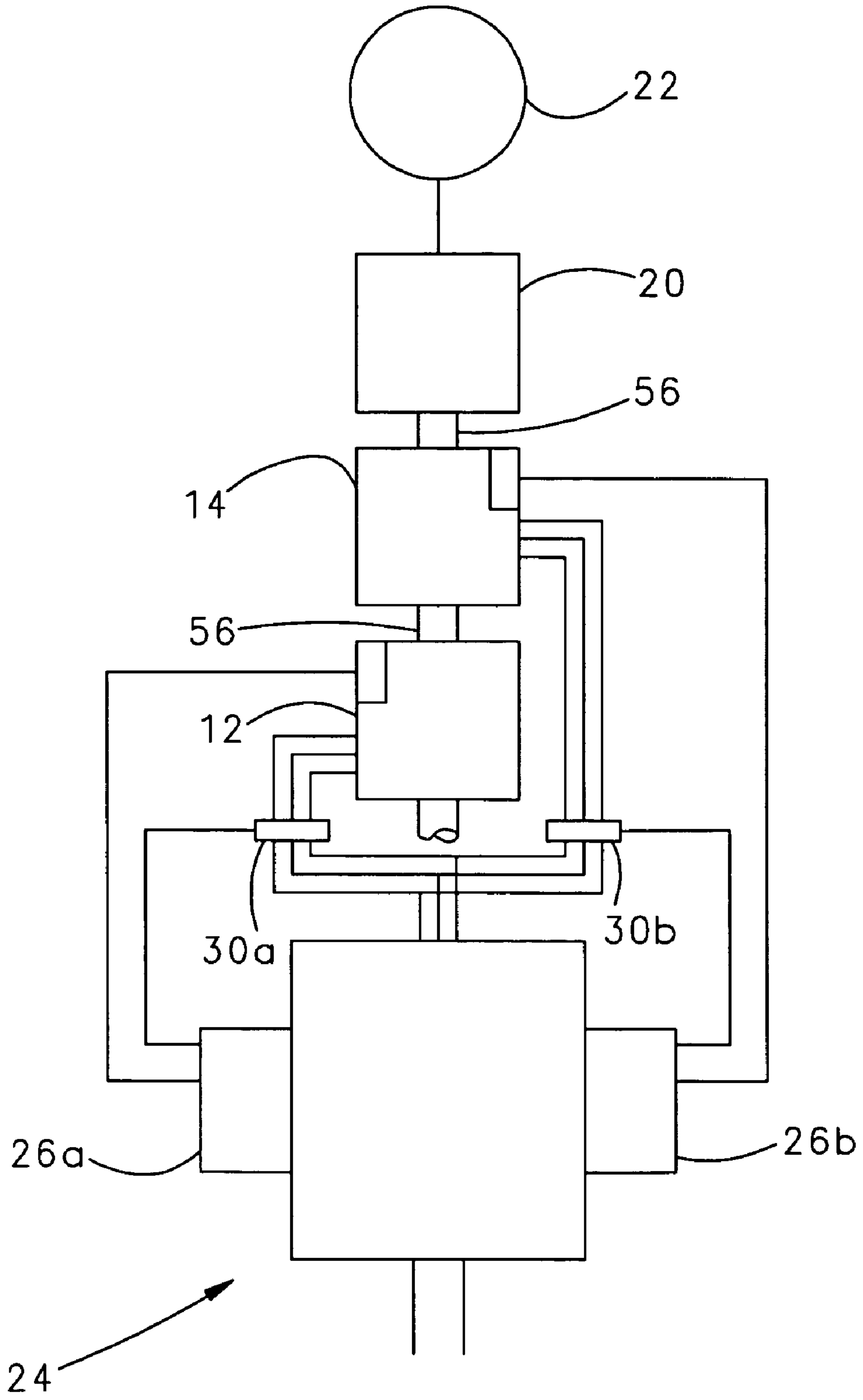
FIG. 3 is a schematic view of a second embodiment of an electric starter-generator system.

Referring to a second embodiment shown in FIG. 3, a first starter-generator 12 and a second starter-generator 14 are mounted on a common output shaft 56 instead of two different output shafts as shown in the example of FIG. 1. The common output shaft 56 is coupled to the gear box 20 or directly to the shaft of the engine to provide torque to the engine 22 or generate electrical output from mechanical energy from the engine 22, similarly to as described above for the example of FIG. 1. This configuration provides a relatively compact configuration.

If the starter-generators were perfectly aligned and if they had identical voltage producing characteristics, they could be operated by the motor drive as if they were a single machine and, as starters, they would then draw identical currents from the motor drive. In one example, the starter-generators are imperfectly aligned and produce somewhat different electro-motive forces when their exciters are supplied with the same voltage control currents. These non-ideal situations will result in their drawing larger than necessary currents and/or an imbalance in the mechanical power that they produce. Some such inefficiencies may be tolerable, but control schemes such as those describe below may be utilized to control the system's performance.

Figure 4:
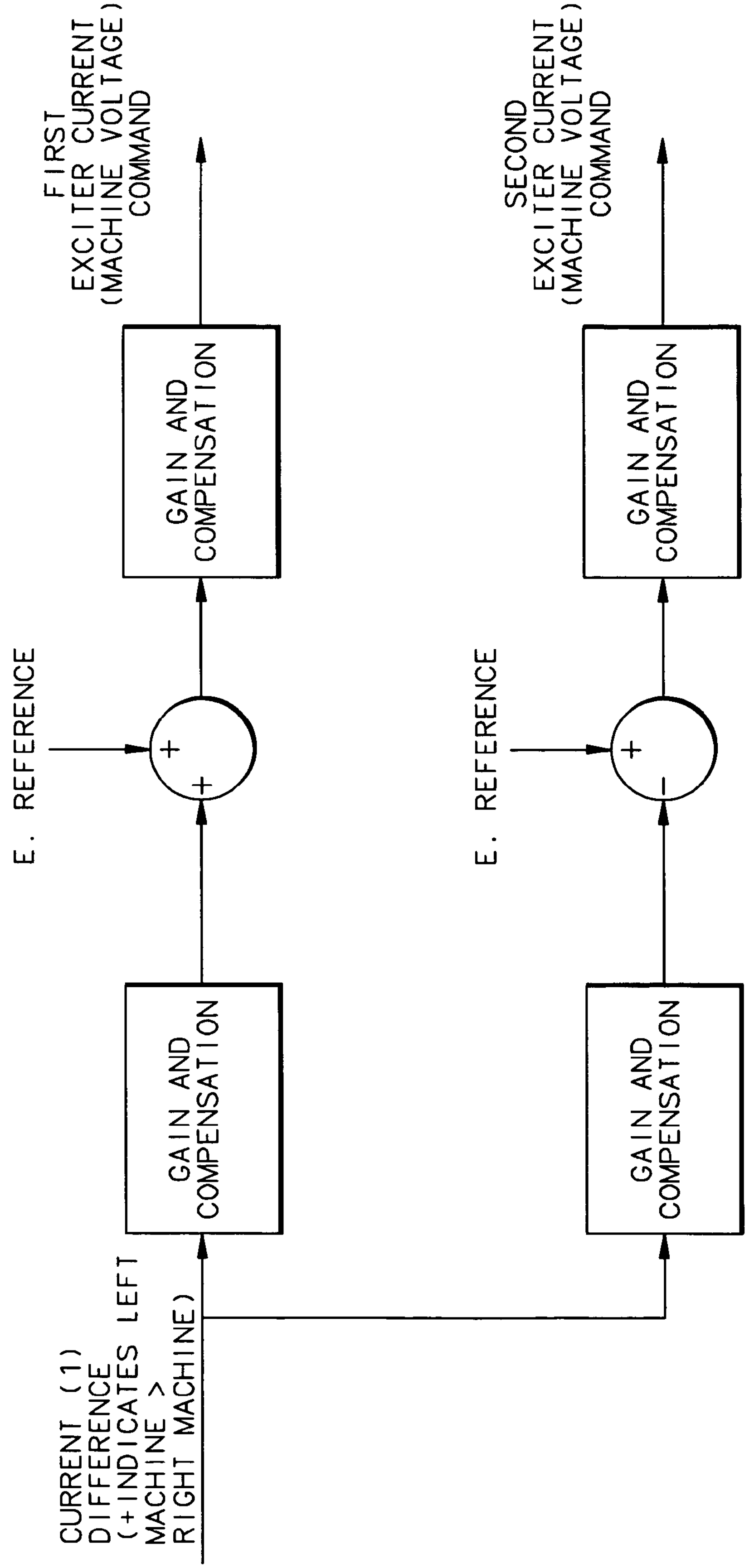
FIG. 4 schematically illustrates a first control scheme for controlling an electric starter-generator system.

FIG. 4 illustrates a control scheme employed to balance, or equalize—the electrical outputs of the first starter-generator 12 and the second starter-generator 14. The drive 24 employs a control scheme in a known manner using hardware, software, or a combination of hardware and software to equalize the electrical outputs when, for example, there is a slight misalignment between the first rotor 40*a* and the second rotor 40*b* or between the first stator 42*a* and the second stator 42*b* (e.g., from manufacturing tolerances, temperature, etc.).

The control scheme includes comparing signals representing the first electrical current input into the first starter-generator 12 with the second electrical current input into the second starter-generator 14. The first sensor 30*a* senses the first electrical current input and the second sensor senses the second electrical current input. Signals from the first sensor 30*a* and second sensor 30*b* correspond to the magnitude of the first and second electrical current inputs and are communicated to the drive 24 for employing the control scheme. The drive 24 determines a difference between the first electrical input and the second electrical input to produce an error signal. The drive 24 then utilizes the error signal to adjust the first electrical input into the exciter of the first starter-generator 12 and second electrical input into the exciter of the second starter-generator 14 to balance the electrical output voltages of the starter-generators. That is, the exciter control elements 26*a* and 26*b* of the motor drive 24 operate to increase the electro-motive force of the starter-generator that is drawing the most input current and to decrease the electro-motive force of the starter-generator that is drawing the least input current in order to assure that the electrical current inputs to the two machines are nearly balanced.

The feature of equalizing the first electrical input and the second electrical input provides the benefit of reducing waste current flowing between the first starter-generator 12 and the second starter-generator 14.

Figure 5A:
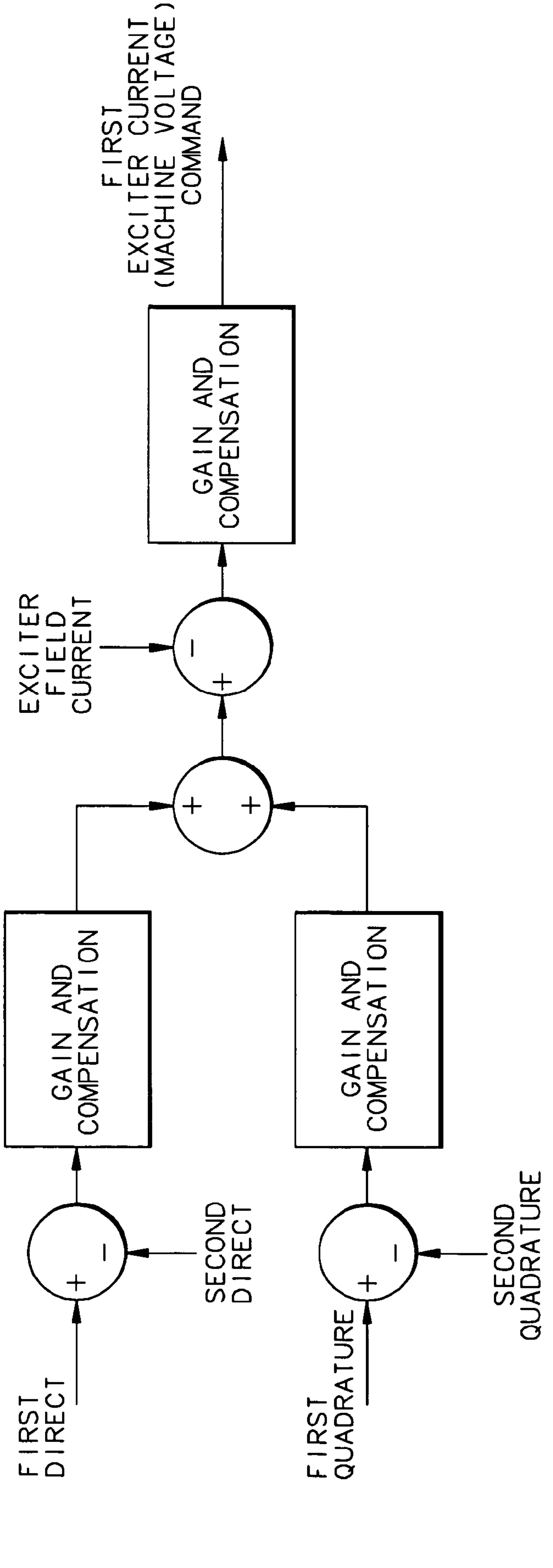
FIG. 5A schematically illustrates a second control scheme for controlling a first starter-generator of an electric starter-generator system.
Figure 5B:
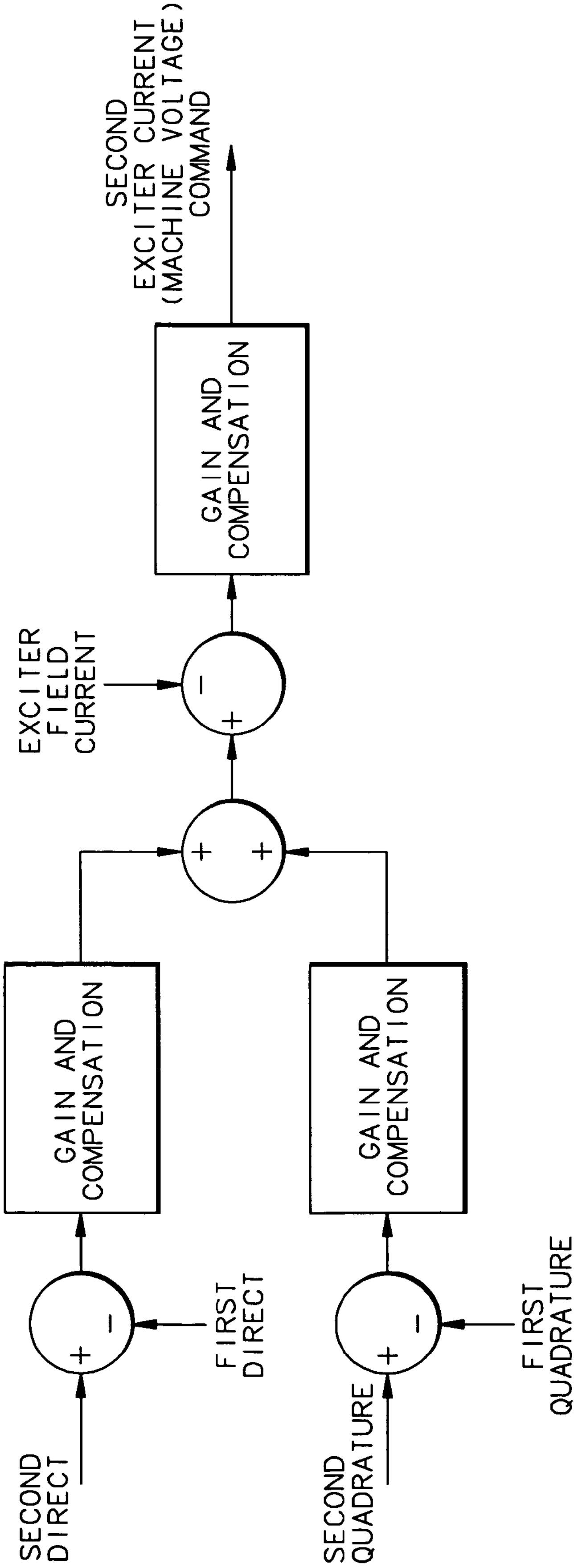
FIG. 5B schematically illustrates a first control scheme for controlling a second starter-generator of an electric starter-generator system.

FIGS. 5A and 5B illustrate another control scheme for controlling the electro-motive forces of the respective first starter-generator 12 relative to the second starter-generator 14. The control scheme is used alternatively to the control scheme described above. In this control scheme, the drive 24 determines a first quadrature axis electrical signal and a first direct axis electrical signal for the first starter-generator 12 and a second quadrature electrical signal and a second direct a electrical signal for the second starter-generator 14. The terms "quadrature axis" and "direct axis" as used in this description refer to the electric current vectors drawn by starter-generators. These electric current vectors are inherent to any starter-generator and may be determined through measurement.

The drive 24 determines the first quadrature electrical signal based upon the output voltage from the first starter-generator 12, the electrical current input into the first starter-generator 12, and the position of the first rotor 40*a*. As is known, rotor position is determined by a sensor located near the rotors or by "sensorless" computational techniques The first quadrature electrical current and the second quadrature electrical current are the power-producing components of the input currents, while the first direct electrical current and the second direct electrical current are reactive components of the electrical inputs into the starter-generators. As is known, the direct electrical currents are typically minimized.

The drive 24 determines a first trim signal for controlling the first exciter 28*a* and a second trim signal for controlling the second exciter 28*b*. To determine each of the first trim signal and the second trim signal, the drive 24 sums the first direct signal representing the first direct axis current and the second direct access signal to produce a direct axis current error signal that is then scaled and compensated in a known manner. The drive 24 then sums the first quadrature electrical signal and the second quadrature electrical signal to produce a quadrature current error signal, which is scaled and compensated in a known manner before being summed with the direct current error signal. The drive 24 determines the first trim signal and the second trim signal from the sum of the direct access current error signal with the quadrature error signal. The first trim signal is then communicated to the first exciter 28*a* and the second trim signal is communicated to the second exciter 28*b* to adjust the exciter field currents produced by each. The exciter field currents, as described above, control the electro-motive force of the first starter-generator 12 and the second starter-generator 14. Thus, by controlling the exciter field currents, the drive 24 controls the electrical output voltages in order to minimize and balance the currents flowing into the starter-generators.

Without the quadrature electrical signal inputs this control method would operate very much as that of FIG. 4 to eliminate currents circulating between the two starter-generators. The addition of the quadrature current control functions will act to balance the mechanical torques produced by the two starter-generators in the event that the starter-generators are not adequately aligned. To some extent, however, the quadrature electrical signals for both the first starter-generator 12 and the second starter-generator 14 oppose the operation of the direct access electrical signals since they will be operating to increase or decrease the electro-motive forces of the first starter-generator 12 and the second starter-generator 14 to balance quadrature rather than direct currents. This will result in reduced direct current control effectiveness and may result in an insignificant imbalance between the electrical outputs of the first starter-generator 12 and the second starter-generator 14, however this imbalance is expected to be minimal and have minimal impact on starter-generator operations relative to the overall improvement in the combination of quadrature and direct axis balance Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. An electric starter-generator system comprising:

a first starter-generator having a first rotor and first stator that draw a first electric input and produce a first internal electro-motive force;

a second starter-generator having a second rotor and second stator that draw a second electric input and produce a second internal electro-motive force that is approximately in phase with said first electro-motive force; and a drive in electrical communication with said first starter-generator and said second starter-generator, said drive operative to selectively vary said first electric input and said second electric input to maintain the first internal electro-motive force approximately in phase with said second electro-motive force.

2. The system as recited in claim 1, wherein said first rotor includes a first rotor field winding having a first orientation to said first stator and said second rotor includes a second rotor field winding having a second orientation to said second stator that is approximately equal to said first orientation.

3. The system as recited in claim 1, wherein said first rotor and said second rotor are coupled along a common shaft for rotation therewith.

4. The system as recited in claim 1, wherein said first rotor is coupled to a first shaft and said second rotor is coupled to a second shaft.

5. The system as recited in claim 1, wherein said drive includes a first control and a second control for respectively selectively providing electrical power to a first exciter within said first starter-generator and a second exciter within said second starter-generator based upon quadrature axis electrical current signals representative of quadrature axis currents drawn by said first starter-generator and said second starter-generators.

6. The system as recited in claim 1, wherein said drive includes a first control and a second control for respectively selectively providing electrical power to a first exciter within said first starter-generator and a second exciter within said second starter-generator based upon a relative position between said first rotor and said second rotor.

7. The system as recited in claim 1, further comprising at least one sensor in electrical communication with said drive, said sensor operative for detecting the first electric input and the second electric input.

8. The system as recited in claim 7, wherein said at least one sensor comprises a first sensor corresponding to said first starter-generator and a second sensor corresponding to said second starter-generator.

9. The system as recited in claim 1, wherein each of said first starter-generator and said second starter-generator includes an exciter inverter in electrical communication with said drive.

10. The system as recited in claim 1, wherein said drive includes software, hardware, or a combination of software and hardware that selectively varies said first electric input and said second electric input.

11. The system as recited in claim 1, wherein said drive is operative to vary at least one of said first electric input or said second electric input based upon a difference between the first electric input and the second electric input.

* * * * *